US005760772A

United States Patent [19]
Austin

[11] Patent Number: 5,760,772
[45] Date of Patent: Jun. 2, 1998

[54] METHOD FOR AUTOMATICALLY RESIZING A CHILD WINDOW

[75] Inventor: David Monte Austin, Alpine, Utah

[73] Assignee: Novell, Inc., Provo, Utah

[21] Appl. No.: 706,172

[22] Filed: Aug. 30, 1996

[51] Int. Cl.⁶ .................................................. G06F 3/00
[52] U.S. Cl. .................................................. 345/342
[58] Field of Search .................................. 345/326, 358, 345/439

[56] References Cited

U.S. PATENT DOCUMENTS

| | | | |
|---|---|---|---|
| 5,197,120 | 3/1993 | Saxton et al. | 345/439 |
| 5,408,602 | 4/1995 | Giokas et al. | 345/340 |
| 5,487,143 | 1/1996 | Southgate | 345/342 |
| 5,513,342 | 4/1996 | Leong et al. | 345/342 |
| 5,522,025 | 5/1996 | Rosenstein | 345/340 |
| 5,528,744 | 6/1996 | Vaughton | 345/342 |
| 5,544,300 | 8/1996 | Skarbo et al. | 343/326 |

OTHER PUBLICATIONS

Simpson, "Mastering Wordperfect 5.1 & 5.2 for Windows", Sybex, pp. 415–417, 443–444, 1993.

*Primary Examiner*—John E. Breene
*Attorney, Agent, or Firm*—Dinsmore & Shohl LLP

[57] ABSTRACT

A method for automatically resizing and repositioning child windows within a parent window upon a request to resize the parent window. The method intelligently resizes child windows within a parent window to maintain a uniform border between the child windows, and between the child windows and the parent window edges, and to efficiently utilize the increased space of the resized parent window.

17 Claims, 9 Drawing Sheets

METHOD FOR AUTOMATICALLY RESIZING A CHILD WINDOW

TECHNICAL FIELD

The present invention relates generally to resizing child windows positioned within a parent window upon a request to resize the parent window, and is particularly directed to a method for automatically resizing such child windows and maintaining a uniform border between the child windows, and between the child windows and the edges of the parent window. The invention efficiently utilizes the area of the resized parent window and provides a relatively uniform and aesthetic appearance without requiring a window designer to develop custom routines or to specify at design time how the child windows should resize.

BACKGROUND OF THE INVENTION

Most computers today run a multi-tasking operating system which permits more than one program to be active on the computer at any given time. In such an environment, one popular means of segregating information from two programs, or from unrelated functions within the same program, is by dividing the display device into a plurality of separate areas, frequently referred to as windows. Each window generally contains one or more groups of related information. One particular type of window, commonly referred to as a parent window, can include one or more child windows positioned inside the parent window. Child windows are often used to further group related information within the parent window. Child windows are generally integral with the parent window such that when a user moves the parent window, the child windows move with the parent window and maintain their relative position within the parent window.

Parent windows can be resizable or nonresizable. If resizable, a user can engage a portion of the window, typically an outer peripheral edge of the parent window, or a specific predetermined portion of the parent window, and increase the size of the parent window. The engagement is typically accomplished with the use of a user selection apparatus such as a mouse, although some window-oriented user interfaces allow resizing of windows via a keyboard.

Because a user's interaction with a program is accomplished almost entirely through its user interface, the appearance of the user interface of the program, such as the windows presented to the user, can be quite important to the overall desirability and marketability of the program.

A resize of a parent window affects the appearance of any child windows on the parent window. If child windows do not resize upon the resize of a parent window, unused space on the newly resized parent window exists, resulting in a lack of efficient use of the parent window and an unaesthetic appearance. Typically, how a child window is resized upon resize of a parent window is determined at the time the parent and child windows are designed. In general, a designer of a parent and child windows has two ways of controlling how a child window behaves when the parent window is resized. First, the designer can develop, test, and debug program code for each child window which controls the resizing of a child window upon the resize of the parent window. Because a parent window can contain a plurality of child windows, this development process can be very time consuming and relatively expensive. Another option is for a designer of parent and child windows to use certain window designer software which allows the designer to specify through appropriate commands how each child window should behave when its corresponding parent window is resized. This also involves a relatively time consuming process which necessitates establishing display criteria for each child window associated with a parent window. Further, a single program may have a plurality of parent windows, different parent windows being used for different functions of the program. Program developers typically desire that the user interface of the program have a uniform appearance, and that resizing behavior of child windows on parent windows be identical among all the parent windows. In order to achieve a uniform resizing appearance among a plurality of different parent windows, the designer must ensure that each child window on each parent window resizes similarly.

If a program developer wants to convert nonresizable parent windows into resizable parent windows, code must be developed, tested and debugged for each child window, as described above. If the nonresizable parent windows were generated with window designer software which can not generate resizable parent windows, it may be necessary for the program developer to completely reimplement each parent and child window with window designer software which can generate resizable parent windows.

U.S. Pat. No. 5,513,342 discloses a display window layout system which automatically accommodates changes in display resolution and font size within a child window. The system disclosed in the '342 patent recognizes a change in font size or display resolution within a child window and automatically adjusts the size of the child window and, if necessary, the parent window to accommodate the increased font size or display resolution.

It is apparent that a method for automatically and intelligently resizing child windows upon a resize request of an associated parent window, without requiring any program code to control the resize behavior of the child windows, and without requiring the window designer to specify particular resize behavior of each child window would be highly desirable. Such a method would allow a developer to develop a plurality of parent and child windows, each of which would maintain uniform behavior of child window resizing across the family of parent windows, and would also allow nonresizable parent windows to become resizable.

SUMMARY OF THE INVENTION

Accordingly, it is one object of the present invention to provide a method for automatically resizing child windows associated with a parent window without requiring development of child resizing code or requiring specifying how each child window will behave upon the resize of its associated parent window.

It is another object of this invention to provide a method for automatically providing child window resize capabilities to a parent window which previously lacked such resize capabilities.

It is yet another object of this invention to provide uniform child window resize behavior across a family of parent windows.

It is still another object of this invention to provide a method for resizing a child window which maintains a uniform border between child windows as well as between child windows and the edges of a parent window.

Is it yet another object of this invention to provide a method for resizing a child window which maximizes child window space to efficiently utilize the area on a resized parent window.

Additional objects, advantages and other novel features of the invention will be set forth in part in the description that follows and, in part, will become apparent to those skilled in the art upon examination of the invention. The objects and advantages of the invention may be realized and obtained by means of the instrumentalities and combinations particularly pointed out in the appended claims.

According to one embodiment of this invention, a method for automatically resizing child windows associated with a parent window is provided which includes anchoring each edge of a child window a fixed distance from an anchor position on the parent window in response to a parent window display request. The anchor position has a predetermined relationship to an edge of the parent window. A resize request of the parent window is recognized and the child window is positioned within the parent window so that the edge of the child window maintains the fixed distance from the anchor position. The method according to this invention is preferably notified upon initial display of the parent window, and determines for each child window within the parent window whether it is stretchable in the X-direction of the parent window and in the Y-direction of the parent window. Based on the stretchability of the child window, and its relationship with the edges of the parent windows and the other child windows, anchor positions are set for each edge of the child window.

The method according to one embodiment of this invention maintains four sorted lists, each list containing a reference to each child window of the parent window, in the order in which the child windows are positioned from a particular edge of the parent window. For example, one sorted list contains a reference for each child window sorted by the distance of the top edge of the child window from the top edge of the parent window. The first reference in the list is the child window having a top edge closest to the top edge of the parent window, and the last reference in the list is the child window having a top edge farthest from the top edge of the parent window. The method according to this invention can utilize these sorted lists to fix certain edges of child windows to anchor positions having the same locations as the edges of the parent window, thereby maintaining a relatively uniform and aesthetic border between the child window edges and the edges of the parent window.

Each anchor position has a predetermined relationship with an edge of the parent window. The predetermined relationship is such that the anchor position maintains the same relative distance from each edge of the parent window which is parallel to the edge of the child window being anchored. For example, if a left or right edge of a child window is anchored to an anchor position that is located 10 percent of the distance between the left edge of the parent window and the right edge of the parent window, then, upon resizing of the parent window, the left or right edge of the child window will remain anchored to the anchor position that is 10 percent of the distance between the left edge of the resized parent window and the right edge of the resized parent window.

The method according to this invention offers an automatic and intelligent method for resizing child windows upon resize of a parent window which maintains a relatively uniform and aesthetic appearance and efficiently utilizes the area of the resized parent window without requiring a designer to develop resize and positioning code for each child window, or specifying for each child window how the child window should behave upon resizing of the parent window. The method according to this invention can be utilized not only to eliminate time-consuming development of repositioning code, but also to implement resizing capabilities for parent windows which previously were not resizable.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrates several aspects of the present invention, and together with the description serve to explain the principles of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION OF THE PREFERRED EMBODIMENT

Figure 1:
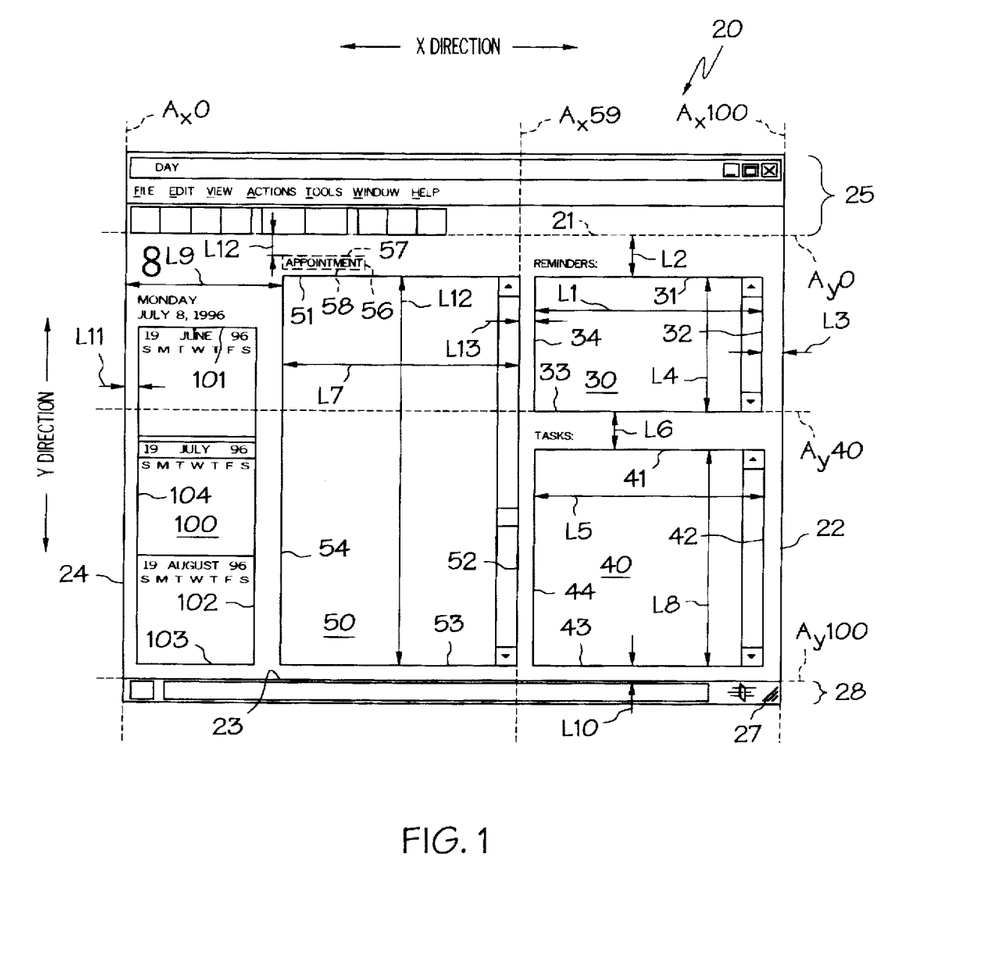
FIG. 1 is a schematic view of a parent window and a plurality of child windows within the parent window.

Referring now to the drawings, FIG. 1 shows parent window 20 and a plurality of child windows. Examples of child windows positioned within parent window 20 are child windows 30, 40, 50, 56, and 100. Although each child window has a top edge, a right edge, a bottom edge, and a left edge, the edges of a child window are not always visible to a user. For example, the dashed lines about child window 56 represent hidden child edges which are not visible to a user. Although the method according to this invention can be utilized with any graphical display interface, the examples of parent and child windows shown and described herein are illustrated as they appear on the Microsoft Windows™ 95 operating system.

Upper portion 25 of parent window 20 is an area of parent window 20 which extends above line $A_y0$ to the upper edge of parent window 20. Upper portion 25 is a relatively fixed area of parent window 20 and is formatted and generated by the operating system. As used throughout this specification, the phrase top edge of parent window 20 refers to dashed line 21, which is also the location of anchor position $A_y0$, as described in more detail below. Similarly, lower portion 28 which extends below line $A_y100$ to the lower edge of parent window 20 is also a relatively fixed area of parent window 20 which is formatted and generated by the operating system. Thus, as used throughout this specification, the phrase bottom edge of parent window 20 refers to line 23, which is also the location of anchor position $A_y100$, as described in more detail below. Thus, reference to the top edge of parent window 20 does not include upper portion 25, and reference to the lower or bottom edge of parent window 20 does not include lower portion 28. This is done for convenience and because of the implementation of windows in the Microsoft Windows 95 operating system, and will not change the nature of this invention as utilized on other operating systems which do not format and prepare certain areas of the parent window for the software developer. Further, it will be apparent that if one desired to include the fixed height of upper portion 25 and lower portion 28 into the determinations of the anchor positions as described below, anchor positions could be set with respect to the actual upper and lower edges of parent window 20 rather than edges 21 and 23.

Parent window 20 can be resized by selecting a peripheral sizing border about parent window 20 or sizing grip 27 with a cursor device, and setting parent window 20 to a desired size. Parent window 20 will then be redisplayed at the new requested size. If child windows 30, 40, and 50, for example, are not resized and repositioned on a resized parent window 20 which has been resized to a larger size than its original size, the child windows will remain in their original positions and distance L3 between child edge 32 and window edge 22, and distance L10 between child edge 43 and window edge 23, will increase due to the increased size of parent window 20 and the static size of child windows 30 and 40. This would not only be unaesthetic, but would also not utilize the increased area of parent window 20 very efficiently. For example, if parent window 20 is resized to a height of 1.5 times its original height, it would be desirable for child windows 100, 50, 30, and 40 to also increase in height to more efficiently utilize the increased area within parent window 20. Currently, window designers must develop, test and debug code which repositions and resizes each child window upon resize of the parent window, or must designate for each child window the way it should resize upon resize of the parent window. Both methods are time consuming and fraught with the potential that child windows will not resize uniformly across a family of parent windows. The method according to this invention intelligently and automatically resizes child windows 30, 40, 50 and 100 to efficiently utilize the space within parent window 20 and maintain a uniform border between the edges of the child windows, and the edges of the child windows and the edges of parent window 20.

The automatic resizing capabilities of the method according to one embodiment of this invention can be illustrated with reference to both FIGS. 1 and 2. Parent window 20 has been resized from its original size in FIG. 1 to resized parent window 20' in FIG. 2. The method according to this invention automatically resizes child windows 30, 40, 50 and 100 of FIG. 1 to child windows 30', 40', 50', and 100' of FIG. 2 to maintain the same distances, or borders, between the edges of the child windows and the edges of their respective parent window. For example, distance L2 represents the distance between child edge 31 and parent edge 21 as shown in FIG. 1. Distance L240 represents the distance between child edge 31' and parent edge 21' of FIG. 2, and is equal to distance L2. Distance L3 represents the distance between child edge 32 and parent edge 22 as shown in FIG. 1. Distance L3' represents the distance between child edge 32' and parent edge 22' of FIG. 2, and is equal to distance L3. Similarly, distance L10 represents the distance between child edge 43 and parent edge 23, as shown in FIG. 1. Distance L10' represents the distance between child edge 43' and parent edge 23' of FIG. 2, and is equal to distance L10. Distance L11 represents the distance between child edge 104 and parent edge 24, as shown in FIG. 1, and distance L11' represents the distance between child edge 104' and parent edge 24' of FIG. 2, and is equal to distance L11. Distance L9 represents the distance between child edge 54 and parent edge 24 of FIG. 1, and distance L9' represents the distance between child edge 54' and parent edge 24' of FIG. 2, and is equal to distance L9. Similarly, distance L6 represents the distance between child edge 33 and child edge 41, as shown in FIG. 1. Distance L6' represents the distance between child edge 33' and child edge 41' of FIG. 2, and is equal to distance L6. Distance L13 represents the distance between child edge 34 and child edge 52, as shown in FIG. 1. Distance L13' represents the distance between child edge 34' and child edge 52' of FIG. 2, and is equal to distance L13. Thus, the method according to one embodiment of this invention automatically resizes child windows to maintain uniform spacing between child windows, and between child windows and the edges of the parent window to provide efficient utilization of parent window 20' and a relatively uniform and aesthetic view.

Figure 2:
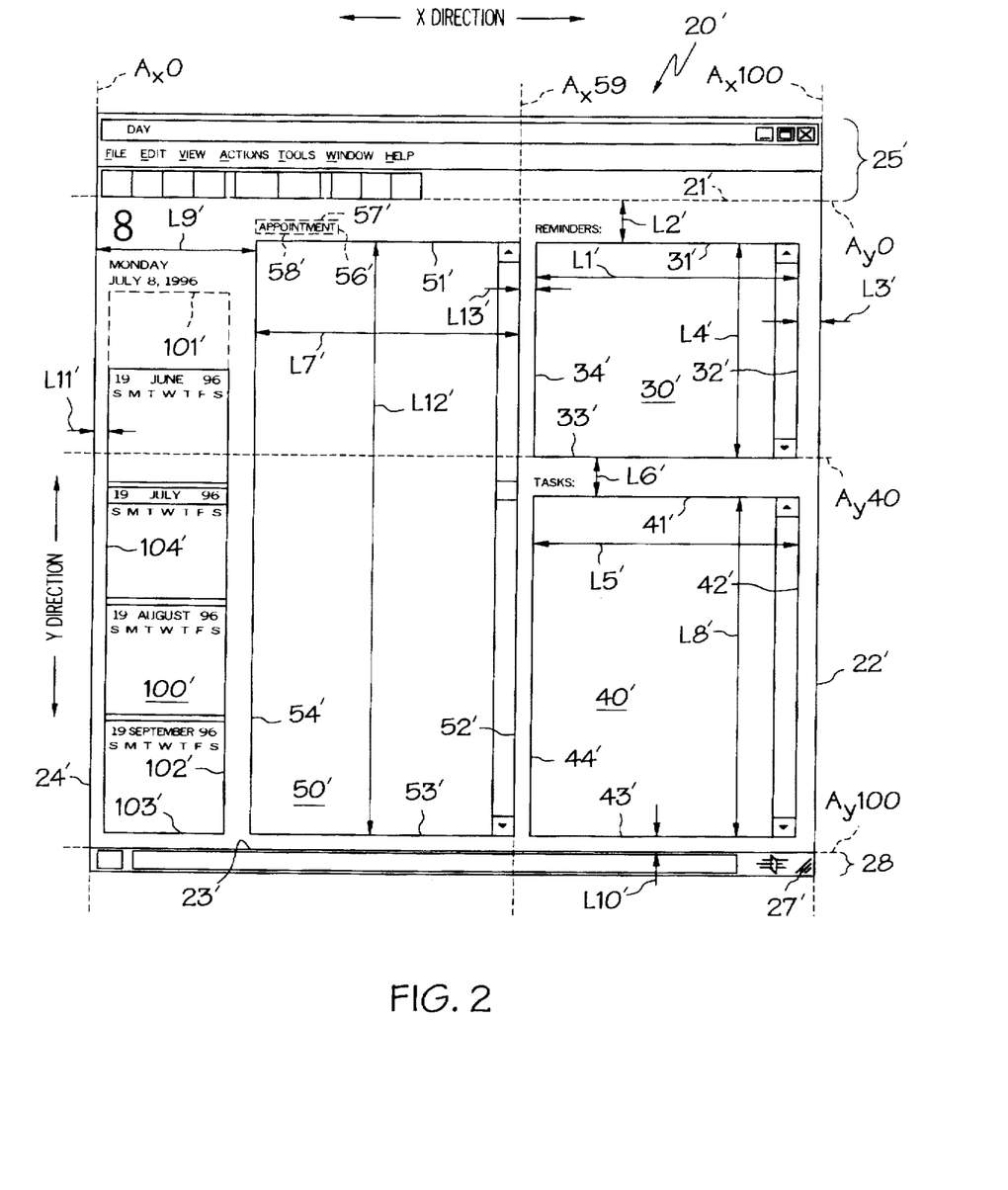
FIG. 2 is a schematic view of the parent and child windows shown in FIG. 1 after the parent window has been resized, according to one embodiment of this invention.

The method according to this invention can also expand child windows according to stretchability properties of the child window, as described below, to efficiently utilize the increased space of parent window 20', as shown in FIG. 2. For example, with reference to FIG. 1, child window 30 originally had a width L1 and a height L4. As shown in FIG. 2, after resize of parent window 20, child window 30' has an increased width L1' and an increased height L4'. Similarly, child window 40 had an original width L5 and height L8 in parent window 20 of FIG. 1, and an increased width L5' and height L8' in parent window 20' of FIG. 2. Child window 50 as shown in parent window 20 of FIG. 1 had a width L7 and a height L12, and an increased width L7' and height L12' as shown in parent window 20' of FIG. 2.

The method according to this invention anchors each edge of each child window a fixed distance from an anchor position on the parent window. The fixed distance between the child window edge and the anchor position can be a zero distance, in other words the same position as the anchor itself. The anchor position maintains a predetermined relationship to an edge of the parent window. For example, as shown in FIG. 1, anchor position $A_x59$ is 59 percent of the distance between parent edge 24 and parent edge 22. Anchor position $A_x59$ will remain 59 percent of the distance between parent edge 24 and parent edge 22 regardless of the size of parent window 20. Thus, as shown in FIG. 2, although the absolute distance between parent edge 24' and anchor position $A_x59$ has increased, anchor position $A_x59$ remains 59 percent of the distance between parent edge 24' and parent edge 22'. Similarly, anchor position $A_x0$, which has the same location as parent edge 24 on parent window 20 of FIG. 1, will have the same location as parent edge 24 regardless of the size of parent window 20. Referring to the Y-direction, anchor position $A_y40$ is 40 percent of the distance between parent edge 21 and parent edge 23 of FIG. 1. As shown in parent window 20' of FIG. 2, anchor position $A_y40$ remains 40 percent of the distance between parent edge 21' and parent edge 23'. The method according to one embodiment of this invention maintains an equal distance L2 between child edge 31 and parent edge 21, and L2' between child edge 31' and parent edge 21', as shown in FIGS. 1 and 2, by anchoring child edge 31 to anchor position $A_y0$, which has the same location as parent edge 21. As shown in FIG. 2, even though parent window 20' has increased in size, distance L2' between child edge 31' and parent edge 21' remains the same because child edge 31 was initially anchored to anchor position $A_y0$. Referring again to FIG. 1, child edges 57 and 58 of child window 56 are also anchored to anchor position $A_y0$, resulting in distance L12 between child edge 57 and parent edge 21 being the same in FIG. 1 as distance L12' between child edge 57' and parent edge 21' in FIG. 12.

Referring again to FIG. 1, child edge 33 has been anchored to anchor position $A_y40$. Anchor position $A_y40$ has the same location as child edge 33. Child edge 41 of child window 40 has also been anchored to anchor position $A_y40$. As shown in FIG. 2, child edge 33' maintains its position with respect to anchor position $A_y40$ as does child edge 41', resulting in distance L6 being the same distance on FIG. 1 and distance L6' on FIG. 2. Further, because anchor position $A_y40$ is in absolute terms farther from window edge 21' in FIG. 2 than from window edge 21 in FIG. 1, child edge 33' has stretched in the Y-direction, as shown by distance L4' in FIG. 2.

According to one embodiment of this invention, each child window is a particular type of child window. Each type of child window is either stretchable in the X-direction, stretchable in the Y-direction, stretchable in both the X and Y-directions, or stretchable in neither the X nor Y-directions. For example, child windows 30, 40 and 50 are of type list box. Child windows of type list box are stretchable in both the X-direction and the Y-direction. Thus, when parent window 20 of FIG. 1 was resized to parent window 20' of FIG. 2, child windows 30, 40 and 50 each increased in height along the Y-direction and width along the X-direction, as shown in child windows 30', 40', and 50' of FIG. 2. Child window 56 is of type static text. Child windows of type static text are not stretchable in either the X-direction or the Y-direction. Thus, although parent window 20 of FIG. 1 was resized to parent window 20' of FIG. 2, child window 56 neither increased in height along the Y-direction nor width along the X-direction. Child window 100 is not stretchable in the X-direction and is stretchable in the Y-direction. Thus, as parent window 20 was resized to parent window 20' as shown in FIG. 2, child window 100 increased in height along the Y-direction and did not increase in width along the X-direction, as shown by child window 100'. The dashed line of child edge 101' reflects the actual top edge of child window 100', but child window 100' does not display the top edge because the new height of child window 100' is larger than required to display the month data within child window 100'.

The method according to this invention can be invoked at any time after the coordinates of the parent and child windows are known, and before the resized parent window is actually displayed, and is preferably invoked upon a parent window display request of parent window 20. Upon such display request, the method according to this invention determines for each child window if the child window is stretchable in the X-direction and if it is stretchable in the Y-direction. If the child window is not stretchable in a particular direction, then the edges of the child window which are perpendicular to that particular direction are anchored to the same anchored position. For example, child window 100 is not stretchable in the X-direction. Thus, the method according to this invention anchors the edges of child window 100 which are perpendicular to the X-direction, child edges 104 and 102, to the same anchor position. As shown in FIGS. 1 and 2, child edges 104 and 102 have been anchored to anchor position $A_x0$. If a child window is stretchable in a particular direction, the method according to this invention anchors each edge perpendicular to the direction in which the child window is stretchable to different anchor positions. For example, child window 50 in FIG. 1 is stretchable in the Y-direction. Thus, the method according to this invention anchors child edge 51 to one anchor position and child edge 53 to another anchor position. As the anchor positions move farther from each other in absolute distance as parent window 20 is resized, child window 50 increases in distance in the Y-direction accordingly. This can be seen with reference to FIGS. 1 and 2 as distance L12' between edges 53' and 51' of resized parent window 20' is greater than distance L12 between edges 53 and 51 of parent window 20.

When initially invoked, the method according to this invention preferably sets anchors for each edge of each child window according to its stretchability in the X and Y-direction, its position with respect to the edges of parent window 20 and its position with respect to other child windows. These anchor positions are preferably retained in memory. According to one embodiment of this invention, an object is associated with each child window, and the anchor position of each child edge is saved in the object structure. Upon a resize request of parent window 20, the method according to this invention is again invoked, and as a function of the new size of resized parent window 20', the method according to this invention calculates a new position for each child window and a new height and width, if appropriate, according to its previously determined anchor position.

Figure 3:
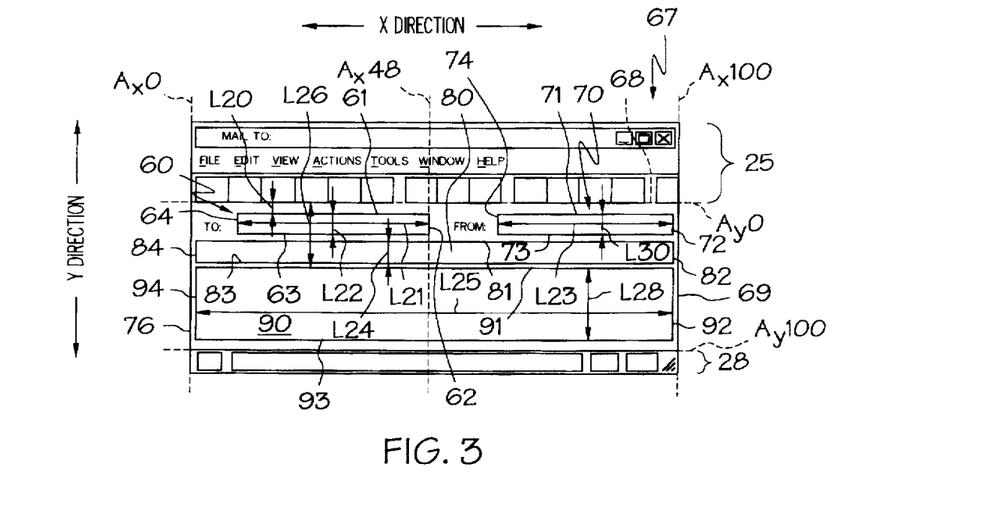
FIG. 3 is a schematic view of another parent window and a plurality of child windows within the parent window.
Figure 4:
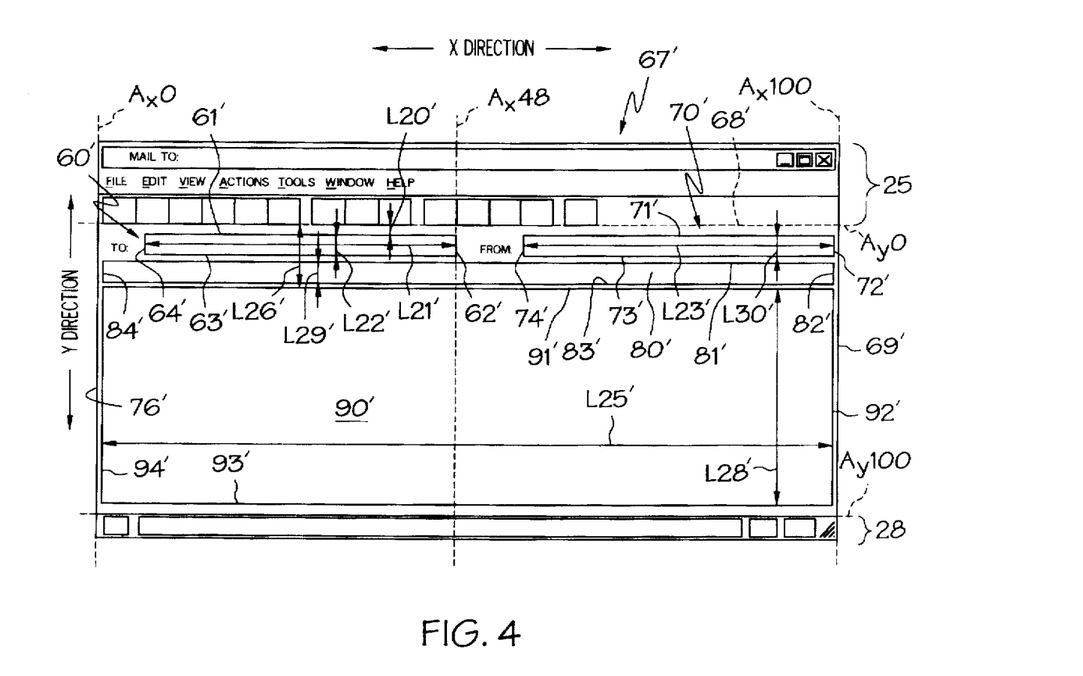
FIG. 4 is a schematic view of the parent and child windows shown in FIG. 3 after being resized, according to one embodiment of this invention.

FIGS. 3 and 4 illustrate another example of the method according to this invention for automatically resizing child windows upon resize of a parent window. Child window 90 is a type of child window which seeks the maximum available space in the event of a resize of the parent window. The method according to this invention, upon recognizing the existence of such a space-seeking child window on a parent window, changes the stretchability of child windows based on their position on the parent window with respect to child window 90. All child windows positioned between child edge 91 and parent edge 68 will be non-stretchable in the Y-direction to allow child window 90 to maximize its height upon resize of parent window 67. Likewise, although none exist on parent window 67, child windows between child edge 92 and parent edge 69, and child windows between child edge 94 and parent edge 76 would not be stretchable in the X-direction to allow child window 90 to grow to its maximum width in the event of a resize of parent window 67. Thus, as shown in FIG. 4, child windows 60', 70', and 80' all stretched in the X-direction but were non-stretchable in the Y-direction. Distances L20, L22, L24, L26 and L30 of FIG. 3 are equal to distances L20', L22', L24', L26' and L30' of FIG. 4, respectively. This is accomplished by anchoring child edges 71, 61, 73, 63, 81, 83 and 91 to anchor position $A_y0$. Child edge 93 is anchored to anchor position $A_y100$, which causes distance L28' of FIG. 4 to be greater than distance L28 of FIG. 3. In the X-direction, child edges 64, 84 and 94 are anchored to anchor position $A_x0$, child edges 62 and 74 are anchored to anchor position $A_x48$, and child edges 72, 82 and 92 are anchored to anchor position $A_x100$. This results in distances L21', L23', and L25' of FIG. 4 being greater than distances L21, L23 and L25, respectively. Thus, the method according to this invention allows a certain type of child window which seeks the maximum available space to override the predetermined stretchability of other child windows positioned on the same parent window.

The method according to one embodiment of this invention initially sets the anchor positions of each edge of the child windows upon a display request of the parent window. One method of setting such anchor positions is illustrated in FIGS. 5–9. The method according to this invention then utilizes the previously set anchor positions to reposition and resize the child windows upon a resize request of the parent window, such method being illustrated in FIG. 10.

Figure 5:
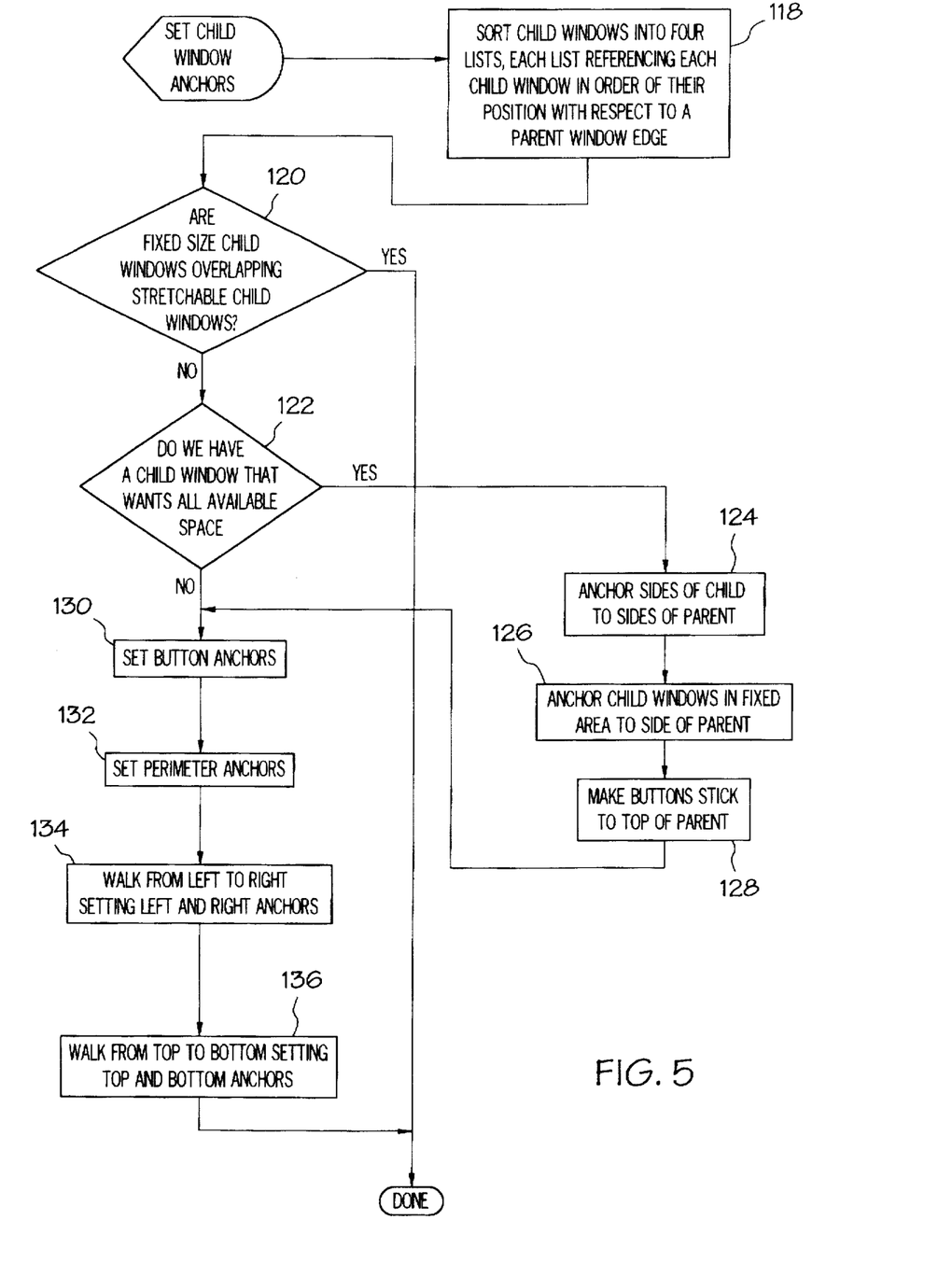
FIG. 5 is a flow diagram illustrating a method for anchoring child windows with respect to an associated parent window according to one embodiment of this invention.

FIG. 5 is a flow diagram illustrating one embodiment of the method according to this invention. After being invoked upon a display request of parent window 20, four lists are created at block 118, each list containing a reference to each child window in the order of the position of each child window with respect to a particular parent edge. For example, one list will contain a reference to each child window in the order by which each child window's top edge is closest to the top edge of the parent. The first child window in the list will be the child window having its top edge closest to the top edge of the parent window. The last reference in the list will be the child window having its top edge farthest from the top edge of the parent window. Another list will contain a reference to each child window in the order by which each child window's right edge is closest to the right edge of the parent. The method according to this invention can utilize such sorted lists to examine each child window according to its relative position with respect to a particular edge of the parent window, as described in more detail below.

The method according to this invention determines whether each particular type of child window is stretchable in the X-direction, the Y-direction, both directions or neither direction. Such determinations can be derived from a table which can be modified, or can be hardcoded in a program, for example. A child window not stretchable in either the X-direction or Y-direction is referred to as a fixed size child window. At block 120, each child window is analyzed to determine if any fixed size child windows overlap stretchable child windows. If so, the method according to this invention assumes that the fixed size child window and overlapping stretchable child windows have been intentionally positioned with respect to each other and to avoid altering such positioning does not attempt to anchor the edges of any child window.

According to one embodiment of this invention, a child window can be a space-seeking type child window which seeks the maximum available space upon resize of the parent window. At block 122 it is determined whether any of the child windows are a space-seeking type of child window, as described above with reference to child window 90. If such a child window exists, then at block 124 the edges of the space-seeking child window are anchored to anchor positions having the same location as the particular edge of the parent window to which the edge is parallel and closest. Thus, the top edge of the child window will be anchored to an anchor position having the same location as the top edge of the parent window, the right edge of the child window will be anchored to an anchor position having the same location as the right edge of the parent window, the bottom edge of the child window will be anchored to an anchor position having the same location as the bottom edge of the parent window and the left edge of the child window will be anchored to an anchor position having the same location as the left edge of the parent window. Thus, child windows above and below such a space-seeking child window are stretchable in the X-direction but are not stretchable in the Y-direction, and child windows to the right and left of such a child window are stretchable in the Y-direction but not stretchable in the X-direction.

At block 130 anchors are set for each edge of each button type child window. According to the embodiment of the method of this invention illustrated in FIG. 5, each button type child window will be anchored to the center of the parent window. For example, the top and bottom edges of a button type child window will be anchored to the $A_y50$ anchor position and the left and right edges of each button type child window will be anchored to the $A_x50$ anchor position. Thus, button type child windows will not be stretchable in the X or the Y-direction and will remain fixed with respect to the center of the parent window. It is apparent that button type child windows could be anchored to locations other than the center of the parent window, for example to the parent edge to which they are closest.

Figure 6:
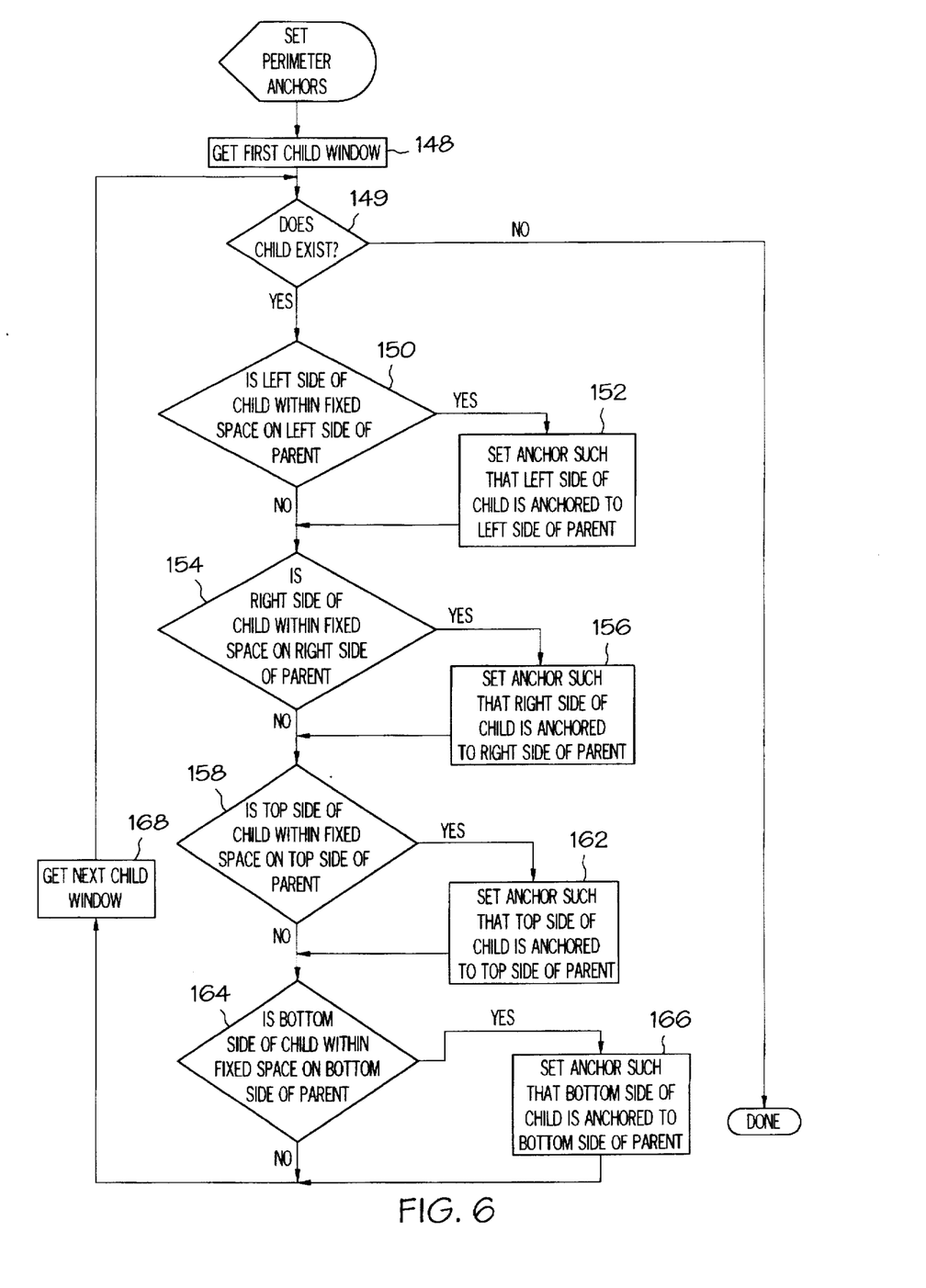
FIG. 6 is a flow diagram illustrating in more detail one aspect of the method illustrated in FIG. 5.

At block 132, child edges positioned near the parent edges are fixed with respect to the parent edge, as illustrated in more detail in FIG. 6. At block 134 of FIG. 5 the child windows are analyzed on the parent window in the X-direction from left to right, and left and right edges of the child windows are anchored. At block 136, child windows are analyzed in the order in which they are positioned on the parent window in the Y-direction from top to bottom, and the top and bottom edges of the child windows are anchored.

FIG. 6 is a flow diagram illustrating the set perimeter anchors function described at block 132 of FIG. 5 in more detail. At block 148, the reference to the first child window in the sorted list is obtained, if the reference is null at block 149, all child windows have been processed and the process terminates. If the reference is not null, at block 150, it is determined whether the left edge of the child window being analyzed is within a fixed space which extends from the left edge of the parent window. If it is, then at block 152 the left edge of the child window is anchored to an anchor position having the same location as the left edge of the parent window.

The fixed space along the left edge of the parent window can be obtained by utilizing the sorted list which contains a reference to each child window in the order by which the left edge of each child window is nearest the left edge of the parent window. Thus, the first child window in the list has its left edge nearest the left edge of the parent window, and the last child window in this list has its left edge farthest from the left edge of the parent window. When the first child window stretchable in the X-direction is encountered, the fixed space along the left edge of the parent window is determined to be the distance between the left edge of the parent window and the left edge of the first child window encountered which is stretchable in the X-direction. Similar determinations are made from the top edge of the parent window, the right edge of the parent window, and the bottom edge of the parent window to provide fixed spaces along each edge of the parent window within which any child window positioned will be anchored to an anchor position having the same location as that respective parent window edge. At block 154, it is determined whether the right edge of the current child window is within the fixed space on the right edge of the parent window. If it is, then at block 156 the right edge of the child window is anchored to an anchor position having the same location as the right edge of the parent window. If it is not, then no anchor is set for the right edge of the child window at this time. At blocks 158 and 162, similar determinations are made with respect to the top edge of the child window, and at block 164 and 166, similar determinations are made with respect to the bottom edge of the child window. At block 168, the method according to this invention obtains the next child window and begins again at block 149.

In general, the method according to this invention will analyze each child window along the X-axis of the parent window, either from left to right or right to left, and along the Y-axis of the parent window, either top to bottom or bottom to top. The discussion herein with reference to FIGS. 7–9, for clarity and to provide a complete understanding of the method according to one embodiment of this invention, assume that the child windows are being analyzed from left to right along the X-axis of the parent window.

Figure 7:
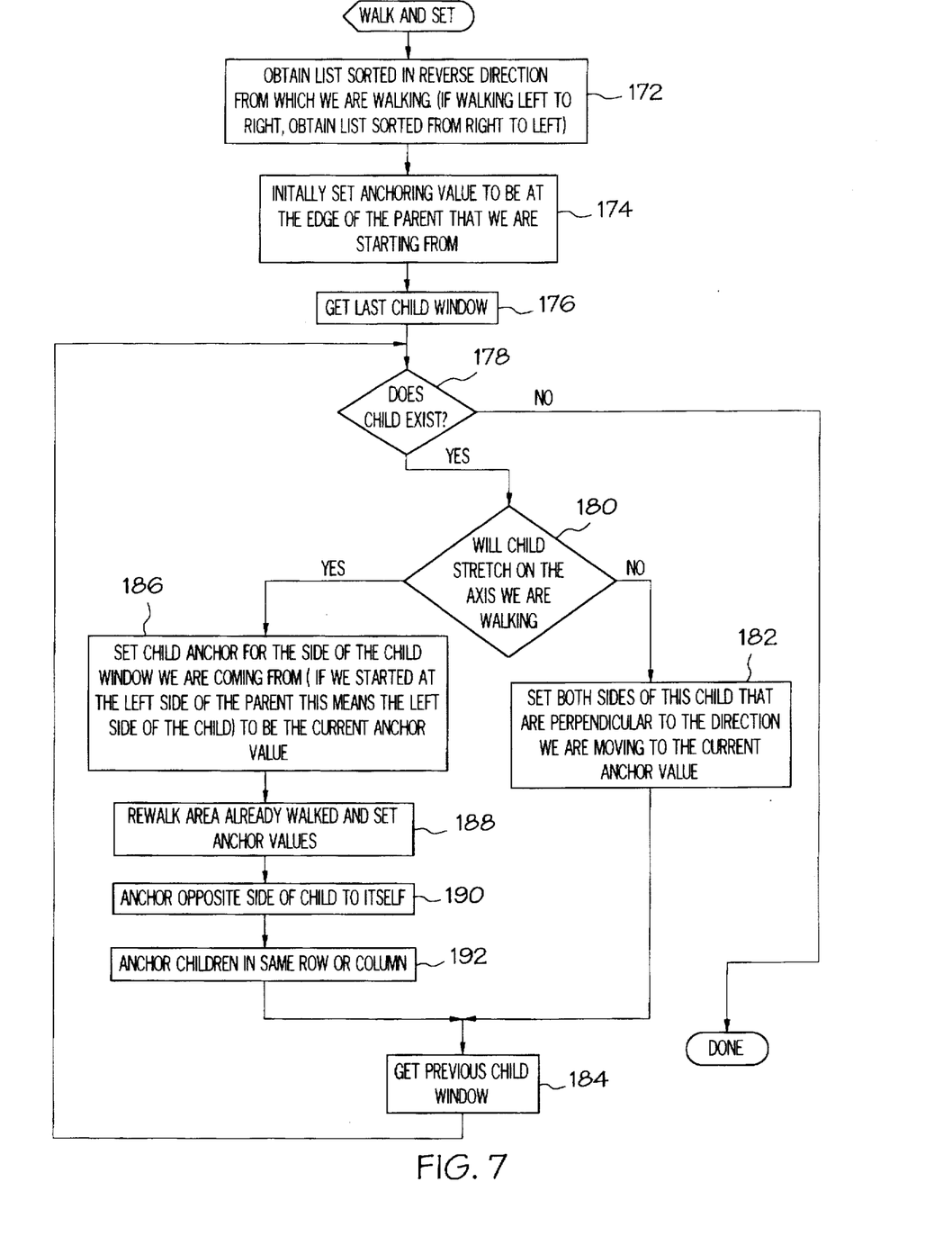
FIG. 7 is a flow diagram illustrating in more detail one aspect of the method illustrated in FIG. 5.

FIG. 7 is a flow diagram illustrating in more detail blocks 134 and 136 of FIG. 5 according to one embodiment of this invention. At block 172, the method according to this invention references the list sorted in the direction opposite the direction being analyzed (or "walked"). For example, at block 134 of FIG. 5, it is indicated that the child windows are being analyzed from left to right. Thus, at block 172, the list sorted according to the distance of each child window's right edge from the right edge of the parent window is referenced. At block 174, an initial anchor value is set to be the same location as the edge of the parent window from which the child windows are being analyzed. With respect to block 134 of FIG. 5, this would be the left edge of the parent window. At block 176 the last reference in the sorted list is obtained, and at block 178 it is determined if the referenced child window exists (reference not null). If it does, then at block 180, it is determined whether the child window will stretch on the axis being traveled. For example, if the child windows are being analyzed from the left to right direction, it is determined whether the child window is stretchable in the X-direction. If not, then at block 182 both edges of the child window perpendicular to the direction being analyzed are set to the current anchor value. For example, if analyzing from left to right, the left and right edges of the child window are perpendicular to the direction being analyzed, and the left and right edges of the child window are anchored to the current anchor value. At block 184, the previous child window in the list sorted in the opposite direction from which we are traveling is obtained. If the child window is stretchable along the direction being analyzed, then at block 186 the edge of the child window closest to the parent window edge from which the child windows are being analyzed is anchored to the current anchor value. Each time a stretchable child window is encountered, then at block 188 the area between the parent window edge from which the child windows are being analyzed (left parent edge in this example) and the stretchable child window is reanalyzed, as discussed in more detail below. At block 190, the opposite edge of the child window is anchored to an anchor position having the same location as the position of that opposite child window edge. At block 192, each child window determined to be within the same row or column of the current child window being analyzed is anchored to the same anchor position to which the child window edge is anchored at block 190, as discussed in more detail below with reference to FIG. 9.

Figure 8:
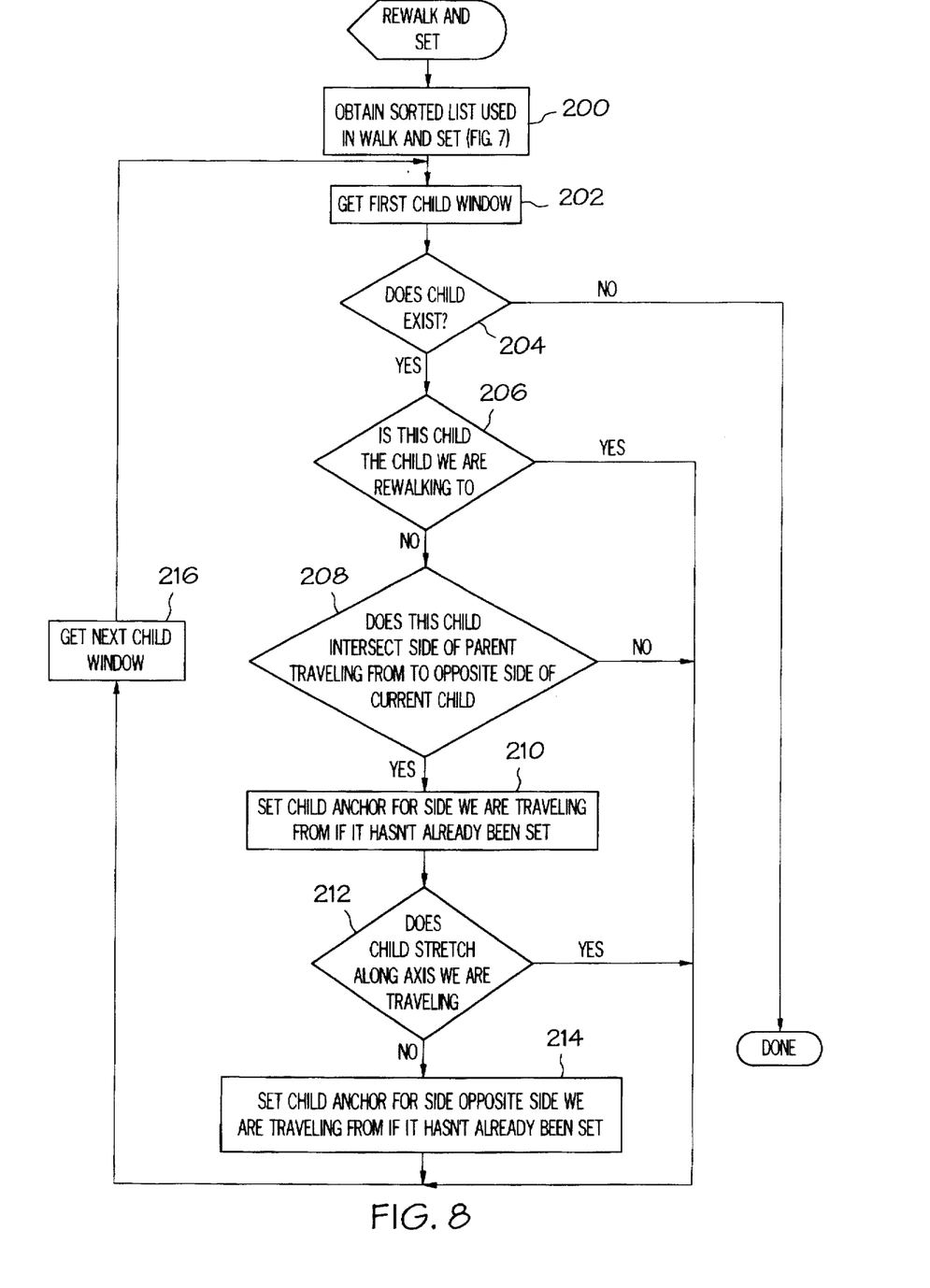
FIG. 8 is a flow diagram illustrating in more detail one aspect of the method illustrated in FIG. 7.

FIG. 8 is a flow diagram illustrating in more detail the process described at block 188 of FIG. 7, according to one embodiment of this invention. At block 202 the first reference in the sorted list is obtained, and at block 204 it is determined if the reference is valid. If the child window does exist, then at block 206, it is determined whether the child window being analyzed is the child window being rewalked to. If it is, then at block 216, the next child window in this sorted list is obtained. If not, then at block 208 the method according to this invention determines if the child window being analyzed is at least partially positioned between the edge of the parent window from which the child windows are being analyzed (left parent edge in this example) and the opposite side of the child window (right child edge in this example) to which we are rewalking. If the child window is at least partially positioned in such area, at block 210, the anchor position of the edge of the child window nearest the edge of the parent window from which we are traveling is set (in this example the left edge of the child window), if the anchor position for that child edge has not already been set. At block 212, it is determined if the child stretches along the axis being walked, and, if it does, then at block 216, the next child window is obtained. If at block 212 the child window is not stretchable along the axis being walked, then at block 214, the anchor position for the edge of the child window opposite the edge previously set is set if it has not already been set (in this example this would be the right edge of the child window).

Figure 9:
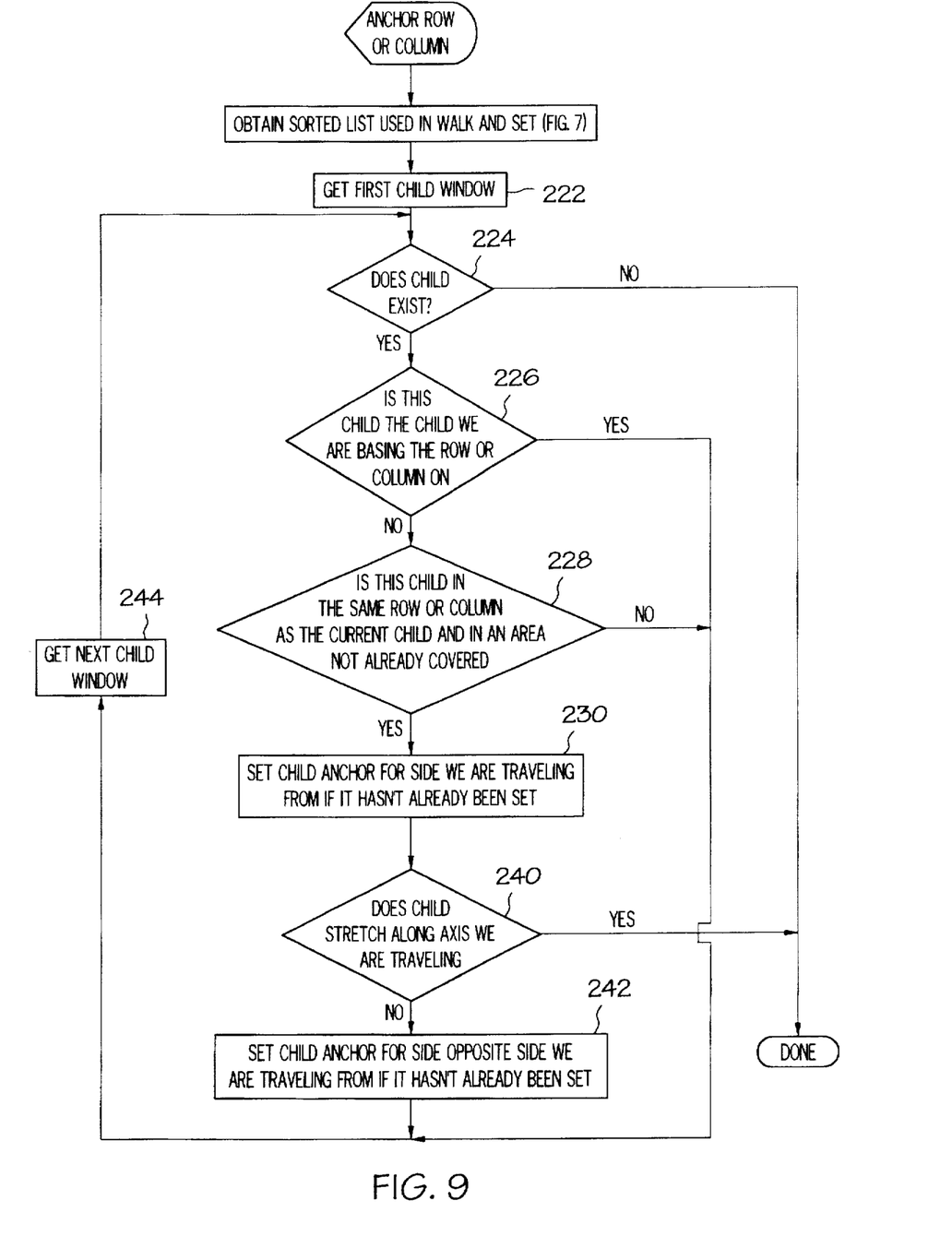
FIG. 9 is a flow diagram illustrating in more detail one aspect of the method illustrated in FIG. 7.

FIG. 9 is a flow diagram illustrating block 192 of FIG. 7 in more detail. The method illustrated in FIG. 9 is invoked for child windows which are determined to be stretchable at block 192 of FIG. 7. At block 222 the reference to the first child window in the sorted list is obtained and at block 224 it is determined if the most recent reference obtained points to a valid window, or if it is null in which event all child windows in the list have been analyzed. If the reference points to a valid child window, then at block 226, it is determined whether the child window being analyzed is the child window upon which the particular row or column being analyzed is based. If it is, then at block 244, the next child window is obtained. If the child windows are being analyzed along the X-axis (from left to right or right to left) then the method according to this invention determines at block 228 if the child window being analyzed is positioned within the same row as the stretchable child window being analyzed at block 192 of FIG. 7. If the child window being analyzed has its top edge equal to or below the top edge of the stretchable child window, and has its bottom edge equal to or above the bottom edge of the stretchable child window, it is in the same row as the stretchable child window. If the child window being analyzed is not in the same row, then at block 244, the next child window is obtained. If the child window being analyzed is in the same row, then at block 230 the anchor for the edge of the child window being traveled from (in this example the left child edge) is set if it has not already been set. At block 240, it is determined whether the child is stretchable along the axis being examined. If so, control returns to FIG. 7. If the child window being analyzed is not stretchable along the axis being examined, the edge of the child opposite the edge previously set is set if it has not already been set.

Similarly, the method illustrated in FIG. 9 can be invoked when the child windows are being analyzed along the Y-axis, in which event a determination is made whether the analyzed child windows are within the same column as the stretchable child window being analyzed at block 192 of FIG. 7.

Figure 10:
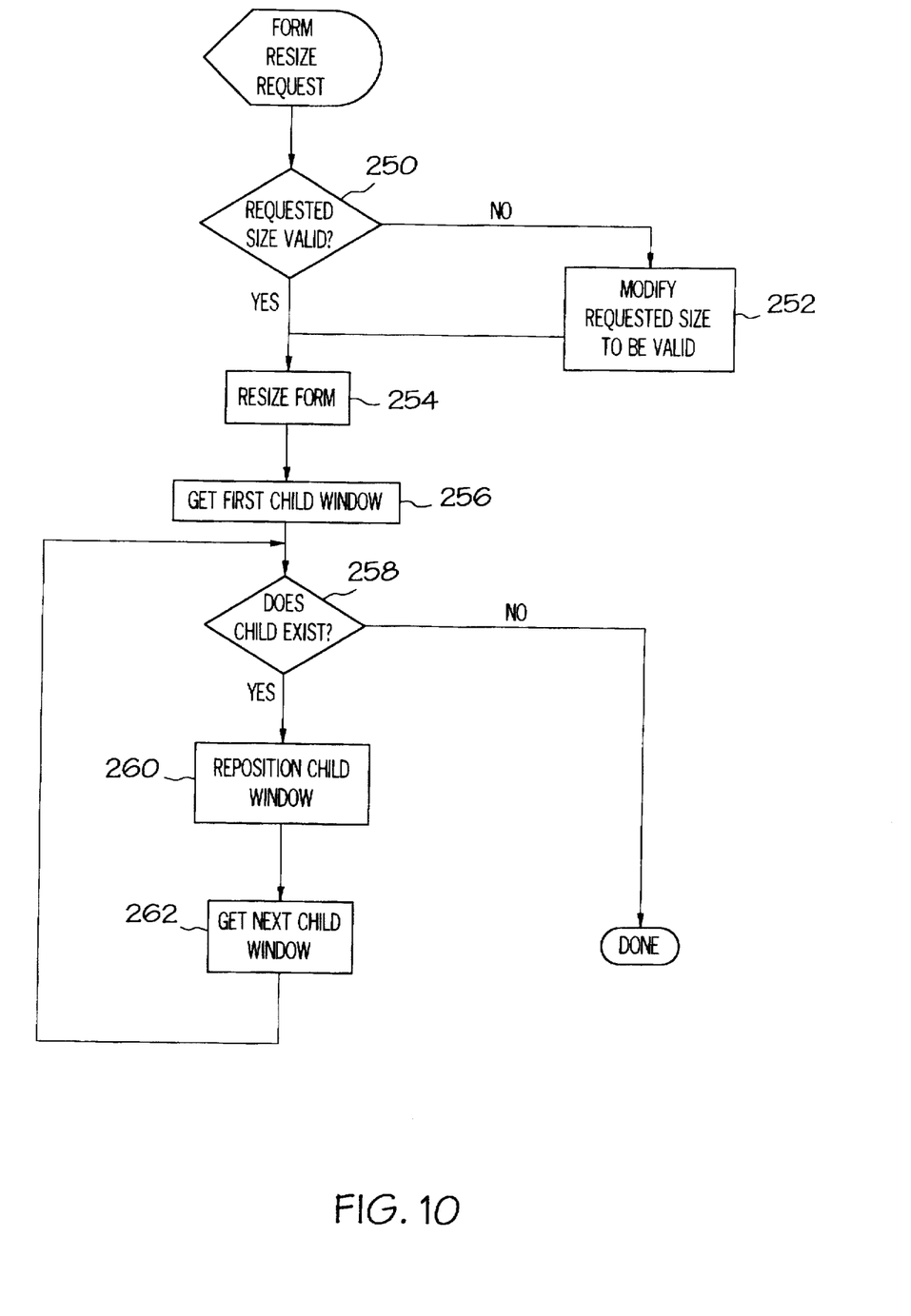
FIG. 10 is a flow diagram illustrating a method for displaying a resized parent window and child windows upon a resize of the parent window, according to one embodiment of this invention.

FIG. 10 is a flow diagram illustrating the process according to one embodiment of this invention for repositioning child windows within the parent window upon notification that the parent window has been resized. At block 250, it is determined whether the requested resize of the parent window is valid. If not, then at block 252, the parent window resize request is altered to be a valid size for the parent window. At block 254, the parent window is resized, but not yet redrawn on the screen. Setting the size and location of a parent window and its child windows for display on a monitor is typically accomplished by passing coordinates and other relevant information to certain operating system functions. These functions are known to those skilled in the art and are documented in publications available to the public, and will not be discussed herein. At block 256, a first child window is analyzed. At block 258, it is determined whether the reference obtained is valid, or if all child windows have been analyzed. If it is valid, then at block 260, the child window is repositioned within the parent window based upon the new size of the parent window, and the anchored positions for each edge of the child window. At block 262, the next child window is obtained and blocks 258, 260, and 262 are repeatedly performed until all child windows are analyzed and resized within the parent window.

While the present invention has been described in terms of edges of windows, it is apparent that a window having four edges can be defined with an X, Y coordinate of a particular corner of the window, a height of the window and a width of the window. Thus, one skilled in the art could utilize the teachings contained herein to anchor one or more specific points, such as one or more particular X, Y coordinates on the child window to one or more specific points on the parent window to achieve a point or coordinate-based anchoring system rather than an edge based anchoring system.

The foregoing description of a preferred embodiment invention has been presented for purposes of illustration and description. It is not intended to be exhaustive or to limit the invention to the precise form disclosed. Obvious modifications or variations are possible in light of the above teachings. The embodiment was chosen and described in order to best illustrate the principals of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. In a parent window having a child window, a method for automatically resizing the child window upon resize of the parent window, comprising:
   a) anchoring each edge of a child window a fixed distance from an anchor position on the parent window in response to a parent window display request, the anchor position having a predetermined relationship to an edge of the parent window;
   b) recognizing a resize request for the parent window; and
   c) positioning the child window within the parent window so that each edge maintains the fixed distance from the anchor position upon recognition of the request to resize the parent window.

2. In a method according to claim 1, wherein the parent window has an X-direction and a Y-direction, and the child window has first and second edges perpendicular to the X-direction, further comprising:
   a) determining if the child window is stretchable in the X-direction,
   b) if the child window is stretchable in the X-direction, anchoring the first edge to a first anchor position and anchoring the second edge to a second anchor position, the second anchor position being a different location from the first anchor position, and
   c) if the child window is not stretchable in the X-direction, anchoring the first edge to the first anchor position and anchoring the second edge to the first anchor position.

3. In a method according to claim 1, wherein the parent window has an X-direction and a Y-direction and a plurality of child windows.

4. In a method according to claim 3, further comprising:
   a) determining whether each child window is stretchable in the X-direction and whether each child window is stretchable in the Y-direction.
   b) traversing the parent window in a first direction from a first parent edge of the parent window to a second parent edge of the parent window such that a first and second child window will be encountered in an order of the distance of a first edge of each child window from the first parent edge, the first edge of each child window being parallel to the first parent edge.
   c) analyzing a first encountered child edge of the first child window, the first encountered child edge being parallel to the first parent edge,
   d) anchoring the first encountered child edge of the first child window to a first anchor position having the same location as the first parent edge,
      i) if the first child window is not stretchable in the first direction, anchoring a second encountered child edge of the first child window which is parallel to the first encountered child edge of the first child window to the first anchor position, and
      ii) if the second child window is stretchable in the first direction, anchoring the second encountered child edge of the first child window to a second anchor position having the same location as the second encountered child edge of the first parent window.

5. A method according to claim 4, further comprising
   a) anchoring a first encountered child edge of the second child window which is parallel to the first parent edge to the same anchor position as the anchor position to which the second encountered edge of the first child window is anchored,
   b) if the second child window is not stretchable in the first direction, anchoring a second encountered edge of the second child window which is parallel to the first parent edge to the same anchor position to which the first encountered child edge of the second child window is anchored, and
   c) if the second child window is stretchable in the first direction,
      i) determining if any child windows stretchable in the first direction are positioned between the second encountered edge of the second child window and the second parent edge,
         1) if not, anchoring the second encountered child edge of the second child window to an anchor position having the same location as the second parent edge,
         2) if so, anchoring the second encountered child edge of the second child window to an anchor position having the same location as the second encountered child edge of the second child window.

6. A method according to claim 3, wherein each child window has a first edge and a second edge parallel to the X-direction, further comprising determining whether each child window is stretchable in the X-direction and whether each child window is stretchable in the Y-direction, for each child window stretchable in the X-direction, anchoring the second edge of the child window to an anchor position different from the anchor position to which the first edge of the child window is anchored, and for each child window not stretchable in the X-direction, anchoring the second edge of the child window to the same anchor position to which the first edge of the child window is anchored.

7. A method according to claim 3, wherein the parent window has a top edge, a right edge, and bottom edge, and a left edge, further comprising:
   a) determining a top fixed distance extending from the top edge in a direction toward the bottom edge and having a width extending from the left edge to the right edge,
   b) determining a right fixed distance extending from the right edge in a direction toward the left edge and having a height extending from the top edge to the bottom edge,
   c) determining a bottom fixed distance extending from the bottom edge in a direction toward the top edge and having a width extending from the left edge to the right edge, and
   d) determining a fixed distance extending from the left edge in a direction toward the right edge and having a height extending from the top edge to the bottom edge.

8. A method according to claim 7, wherein each child window has a top edge, a right edge, a bottom edge and a left edge, further comprising:
   a) for each child window having a top edge of the child window positioned in the top fixed distance, anchoring the top edge of the child window to a top anchor position having the same location as the top edge of the parent window,
   b) for each child window having a right edge of the child window positioned in the right fixed distance, anchoring the right edge of the child window to a right anchor position having the same location as the right edge of the parent window,
   c) for each child window having a bottom edge of the child window positioned in the bottom fixed distance, anchoring the bottom edge of the child window to a bottom anchor position having the same location as the bottom edge of the parent window, and
   d) for each child window having a left edge of the child window positioned in the left fixed distance, anchoring the left edge of the child window to a left anchor position having the same location as the left edge of the parent window.

9. A method according to claim 8, further comprising forming a first list of child windows, the list comprising a reference to each child window, the references being in order such that the first reference is a reference to the child window having its top edge closest to the top edge of the parent window and the last reference is a reference to the child window having its top edge farthest from the top edge of the parent window.

10. A method according to claim 9, wherein the top fixed distance is determined by examining, in order, each child window in the first list until a first child window being stretchable in the Y-direction is examined, and setting the top fixed distance to the distance between the top edge of the parent and the top edge of the first child window being stretchable in the Y-direction.

11. In a method according to claim 3, further comprising anchoring each edge of each child window as a function of whether the child window is stretchable in the X-direction and whether the child window is stretchable in the Y-direction.

12. In a method according to claim 11, wherein each child window comprises a particular type of child window, and each type of child window has predetermined stretchability in the X-direction and the Y-direction.

13. In a method according to claim 12, further comprising determining if a first child window seeks maximum resizability, and if so, preventing all child windows positioned above a top edge of the first child window and all child windows positioned below a bottom edge of the first child window from being stretchable in the Y-direction.

14. In a method according to claim 13, further comprising preventing all child windows positioned to the left of a left edge of the first child window and all child windows positioned to the right of a right edge of the first child window from being stretchable in the X-direction.

15. In a parent window having a child window, a method for automatically resizing the child window upon resize of the parent window, comprising:
   a) anchoring a point on a child window a fixed distance from an anchor position on the parent window in response to a parent window display request, the anchor position having a predetermined relationship to an edge of the parent window;
   b) recognizing a resize request for the parent window; and
   d) positioning the child window within the parent window so that the point maintains the fixed distance from the anchor position upon recognition of the request to resize the parent window.

16. In a data processing system in which information is displayed in a parent window having a child window, a system for automatically resizing the child window upon resize of the parent window, comprising:
   a) anchor means for anchoring each edge of a child window a fixed distance from an anchor position on the parent window in response to a parent window display request, the anchor position having a predetermined relationship to an edge of the parent window;
   b) means for recognizing a resize request for the parent window; and
   c) means for positioning the child window within the parent window so that the edge maintains the fixed distance from the anchor position upon recognition of the request to resize the parent window.

17. A computer readable medium comprising a computer program, the computer program capable of automatically resizing a child window upon resize of a parent window by performing the steps of:
   a) anchoring each edge of a child window a fixed distance from an anchor position on the parent window in response to a parent window display request, the anchor position having a predetermined relationship to an edge of the parent window;
   b) recognizing a resize request for the parent window; and
   c) positioning the child window within the parent window so that the edge maintains the fixed distance from the anchor position upon recognition of the request to resize the parent window.

* * * * *

UNITED STATES PATENT AND TRADEMARK OFFICE
CERTIFICATE OF CORRECTION

PATENT NO. : 5,760,772
DATED : June 2, 1998
INVENTOR(S) : David M. Austin

It is certified that error appears in the above-indentified patent and that said Letters Patent is hereby corrected as shown below:

Column 16, line 30 delete "d)" and replace with --c)--.

Signed and Sealed this

Eleventh Day of August 1998

*Attest:*

BRUCE LEHMAN

*Attesting Officer*   *Commissioner of Patents and Trademarks*